US012763242B2

(12) United States Patent
Chuang

(10) Patent No.: US 12,763,242 B2
(45) Date of Patent: Oct. 13, 2026

(54) COMMON MODE FILTER FOR ENHANCING MODE CONVERSION IN BROADBAND COMMUNICATION

(71) Applicant: CYNTEC CO., LTD., Hsinchu (TW)

(72) Inventor: Chia-Cheng Chuang, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 960 days.

(21) Appl. No.: 17/849,735

(22) Filed: Jun. 27, 2022

(65) Prior Publication Data

US 2023/0096266 A1 Mar. 30, 2023

Related U.S. Application Data

(60) Provisional application No. 63/247,811, filed on Sep. 24, 2021.

(51) Int. Cl.
*H01F 17/04* (2006.01)
*H01F 27/28* (2006.01)
*H01F 17/00* (2006.01)

(52) U.S. Cl.
CPC ....... *H01F 17/045* (2013.01); *H01F 27/2823* (2013.01); *H01F 2017/0093* (2013.01)

(58) Field of Classification Search
CPC ..................................................... H01F 17/045
USPC ................................................. 336/192, 221
See application file for complete search history.

(56) References Cited

U.S. PATENT DOCUMENTS 7,201,344 B2 4/2007 Higeta
10,559,415 B2 2/2020 Chuang
10,958,233 B2 3/2021 Asai
10,998,122 B2 5/2021 Komaya
2002/0021201 A1* 2/2002 Ol ......................... H01F 17/045 336/197
2006/0196984 A1* 9/2006 Higeta .................. H01F 41/069 242/472.8
2017/0221626 A1* 8/2017 Tomonari ................ H01F 27/29
2021/0012949 A1 1/2021 Miyamoto

FOREIGN PATENT DOCUMENTS

CN 108346501 A 7/2018
CN 207938442 U 10/2018
CN 110098815 A 8/2019
CN 113178303 A 7/2021
TW 200636771 10/2006
TW 201933767 A 8/2019
TW M583113 U 9/2019
WO 2020/173005 A1 9/2020

* cited by examiner

*Primary Examiner* — Ronald Hinson
(74) *Attorney, Agent, or Firm* — Winston Hsu

(57) ABSTRACT

A common mode filter includes a magnetic core, a first wire wound around the magnetic core and comprising N turns, and a second wire wound around the magnetic core and comprising N turns, N being an integer exceeding 1. An (S+1)th turn of the first wire is stacked on an inner turn of the first wire and an inner turn of the second wire, S being a positive integer less than (N−1).

5 Claims, 9 Drawing Sheets

COMMON MODE FILTER FOR ENHANCING MODE CONVERSION IN BROADBAND COMMUNICATION

CROSS REFERENCE TO RELATED APPLICATIONS

This application claims the benefit of U.S. Provisional Application No. 63/247,811, filed on Sep. 24, 2021. The content of the application is incorporated herein by reference.

BACKGROUND OF THE INVENTION

1. Field of the Invention

The invention relates to a common mode filter, and in particular, to a common mode filter for enhancing mode conversion in broadband communication.

2. Description of the Related Art

A common mode choke (CMC) is an electrical filter that operates on differential signals to suppress a noise current common to the differential signals while allowing the differential signals to pass, preventing the common mode noise from disrupting data in the differential signals. The noise is referred to as common mode nose. Common mode chokes have found wide applications in various electrical systems in noisy environments. For example, a common mode choke can be placed between a transceiver and a controller area network (CAN) bus in an automotive vehicle to block noise from various devices connected to the CAN bus.

Ideally, a common mode choke includes two wires uniformly wound on a magnetic core to form two windings, so as to provide equal inductances and no parasitic capacitance for equal noise suppression to the differential signals. In practice, the common mode choke is often constructed by stacking one winding (stacking winding) on the other winding (bottom winding) to increase inductances thereof in a limited construction space. However, the magnetic permeability of the magnetic core is frequency-dependent, and as a consequence, the inductances of the stacking winding and the bottom winding vary with the data rates of a data transmission, resulting in a degradation of noise immunity, an increase in the electromagnetic interference, and a decrease in mode conversion.

Further, if the capacitive coupling from the stacking winding to the bottom winding and the capacitive coupling from the bottom winding to the stacking winding are mismatched or too far apart, the differential signals will be mismatched in magnitude and/or phase. The mismatch in phase would increase drastically as the electrical systems push up the data rates.

SUMMARY OF THE INVENTION

According to an embodiment of the invention, a common mode filter includes a magnetic core, a first wire wound around the magnetic core and comprising N turns, and a second wire wound around the magnetic core and comprising N turns, N being an integer exceeding 1. An (S+1)th turn of the first wire is stacked on an inner turn of the first wire and an inner turn of the second wire, S being a positive integer less than (N−1).

According to another embodiment of the invention, a common mode filter includes a magnetic core, a first wire wound around the magnetic core and comprising N turns, and a second wire wound around the magnetic core and comprising N turns, N being an integer exceeding 1. An (S+1)th turn of the first wire is stacked on an Sth turn of the second wire and an (S+1)th turn of the second wire, S being a positive integer less than (N−1). A (T+1)th turn of the second wire is stacked on a Tth turn of the first wire and a (T+1)th turn of the first wire, T being a positive integer less than (N−1) and different from S.

According to another embodiment of the invention, a common mode filter includes a magnetic core, a first wire wound around the magnetic core and comprising N turns, and a second wire wound around the magnetic core and comprising N turns, N being an integer exceeding 1. An (S+1)th turn of the first wire is stacked between an (S−1)th turn of the first wire and an Sth turn of the first wire, S being a positive integer exceeding 1 and less than (N−1).

These and other objectives of the present invention will no doubt become obvious to those of ordinary skill in the art after reading the following detailed description of the preferred embodiment that is illustrated in the various figures and drawings.

DETAILED DESCRIPTION

As used herein, the term “inner turn” is a turn of a wire in direct contact to a magnetic core, and the term “outer turn" is a turn of a wire not in direct contact to a magnetic core and stacked on the inner turns.

Figure 1:
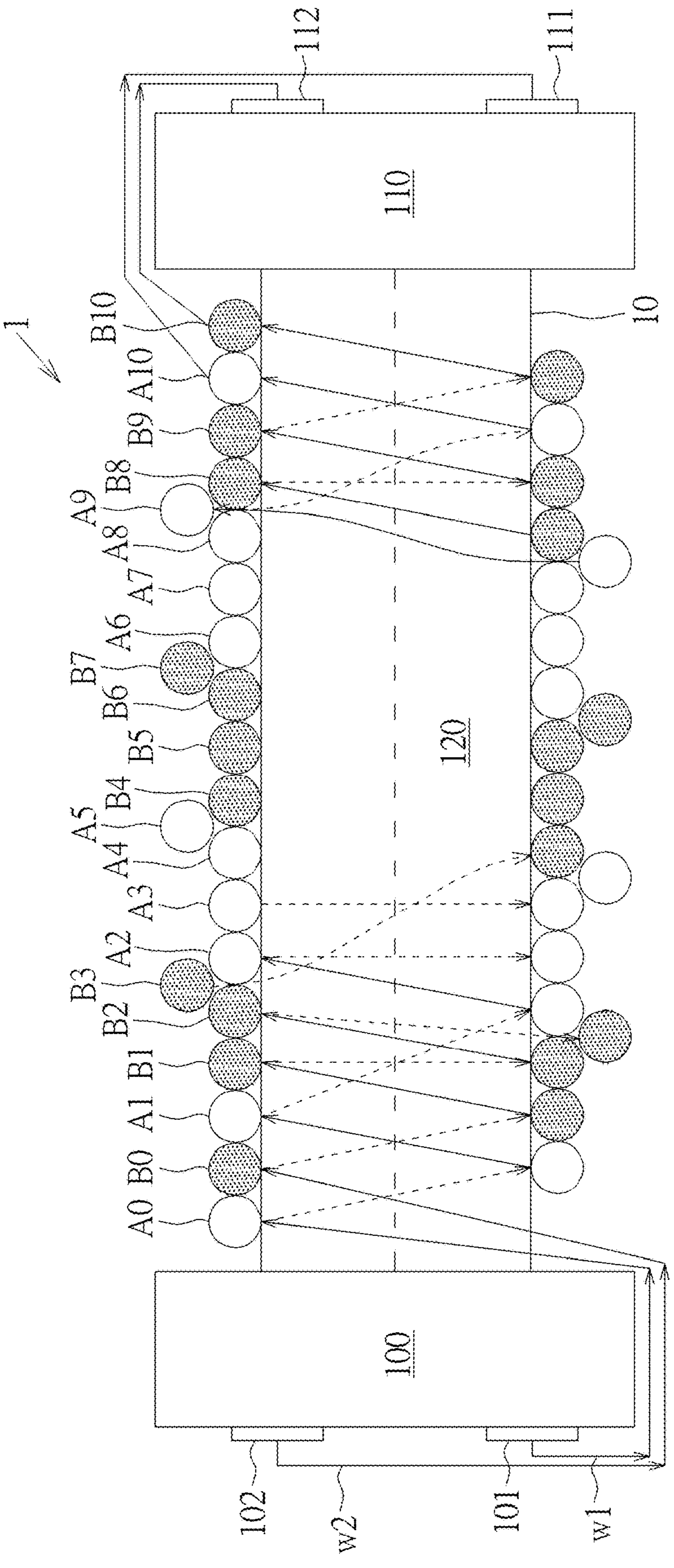
FIG. 1 shows a cross-sectional view of a common mode filter according to an embodiment of the invention.

FIG. 1 shows a cross-sectional view of a common mode filter 1 according to an embodiment of the invention. The common mode filter 1 may receive a pair of differential signals from a transmit terminal, and transfer the differential signals to a receive terminal while significantly suppressing common mode noise. The common mode filter 1 may include a wire w1, a wire w2 and a magnetic core 10. The wires w1 and w2 may be symmetrically wound around the magnetic core 10 to achieve matching winding inductances, matching capacitive couplings, and matching input/output inductances, enhancing the noise immunity, increasing the mode conversion while reducing the phase difference of the differential signals over a wideband spectrum.

The magnetic core 10 may include an end portion 100, an end portion 110 and a center limb 120, the end portion 100 may include a start terminal 101 and a start terminal 102, and the end portion 110 may include an end terminal 111 and an end terminal 112. The starting ends of the wires w1 and w2 may be attached to the start terminals 101 and 102, respectively, the wires w1 and w2 may be wound around the center limb 120 to form N turns of the wire w1 and N turns of the wire w2, respectively, and then the terminating ends of the wires w1 and w2 may be attached to the end terminals 111 and 112, respectively, N being an integer exceeding 1, e.g., N=11. The wire w1 may form turns A0 to A10, and the wire w2 may form turns B0 to B10.

The N turns of the wire w1 and the N turns of the wire w2 may include equal numbers of inner turns and equal numbers of outer turns to achieve a symmetrical winding structure. That is, the number of inner turns of the wire w1 is equal to the number of inner turns of the wire w2, and the number of outer turns of the wire w1 is equal to the number of outer turns of the wire w2, ensuring equal inductances of the wire w1 and wire w2 regardless of the data rate of data transmitted over the common mode filter 1, increasing the noise immunity and increasing the mode conversion over a wideband spectrum. For example, in FIG. 1, the wire w1 includes 9 inner turns and 2 outer turns, the wire w2 includes 9 inner turns and 2 outer turns, and the wire w1 and the wire w2 includes equal numbers of inner turns (=9), and equal numbers of outer turns (=2).

Further, the outer turns of the wire w1 and the outer turns of the wire w2 may be arranged alternately at a short interval, and the outer turn of the wire w1 or the outer turn of the wire w2 may be stacked on inner turns of wire w1 and/or the wire w2 according to a matching order, cancelling out capacitive coupling from the wire w1 to the wire w2 and capacitive coupling from the wire w2 to the wire w1, resulting in net capacitive coupling between the wire w1 to the wire w2 of zero, and leading to no or insignificant phase difference between the differential signals. In some embodiments, the matching order may include an (S+1)th turn of the wire w1 stacked on an inner turn of the wire w1 and an inner turn of the wire w2, S being a positive integer less than (N−1). For example, S=4, the 5th turn (A5) of the wire w1 may be stacked at the groove between the turn A4 and the turn B4 and on the turn A4 and the turn B4. In another example, S=8, the 9th turn (A9) of the wire w1 may be stacked at the groove between the turn A8 and the turn B8 and on the turn A8 and the turn B8. In other embodiments, the matching order may include an (S+1)th turn of the wire w2 stacked on an inner turn of the wire w1 and an inner turn of the wire w2, S being a positive integer less than (N−1). For example, S=2, the 3rd turn (B3) of the wire w2 may be stacked at the groove between the turn B2 and the turn A2 and on the turn B2 and the turn A2. In another example, S=6, the 7th turn (B7) of the wire w2 may be stacked at the groove between the turn B6 and the turn A6 and on the turn B6 and the turn A6. Therefore, the outer turns of the wire w2 (B3, B7), and the outer turns of the wire w1 (A5, A9) are arranged alternately and set apart from each other at an interval of 3 inner turns. Moreover, the outer turns of the wire w2 (B3, B7), and the outer turns of the wire w1 (A5, A9) are stacked on an inner turn of the wire w1 and an inner turn of the wire w2 according to the matching order, so as to form a symmetrical structure of the wires w1 and w2.

The magnetic core 10 may be a rectangular bar including 4 sides, and may be made of a ferrite material or other magnetically permeable materials. The wires w1 and w2 may be wires having insulated surfaces. The solid lines show winding portions of the wires w1 and w2 on the first side of the magnetic core 10, and the dashed lines show winding portions of the wires w1 and w2 on the other sides of the magnetic core 10.

Figure 2B:
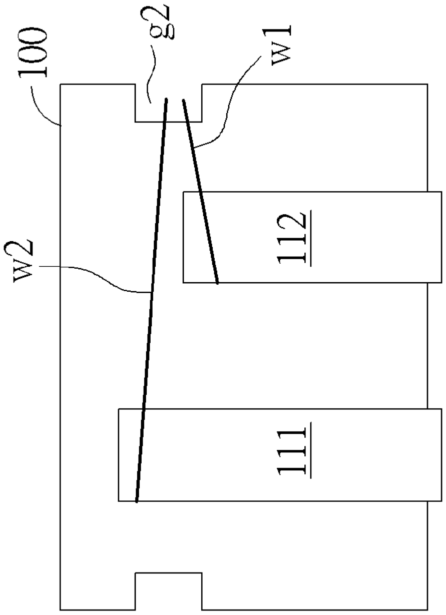
FIG. 2A and FIG. 2B show side views of the end portions of the common mode filter in FIG. 1.
Figure 2A:
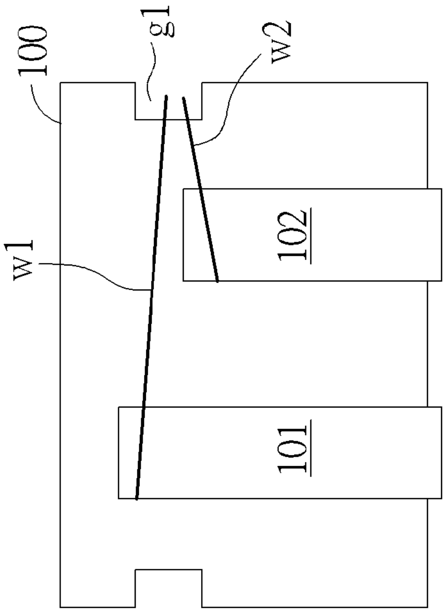
Figure 2C:
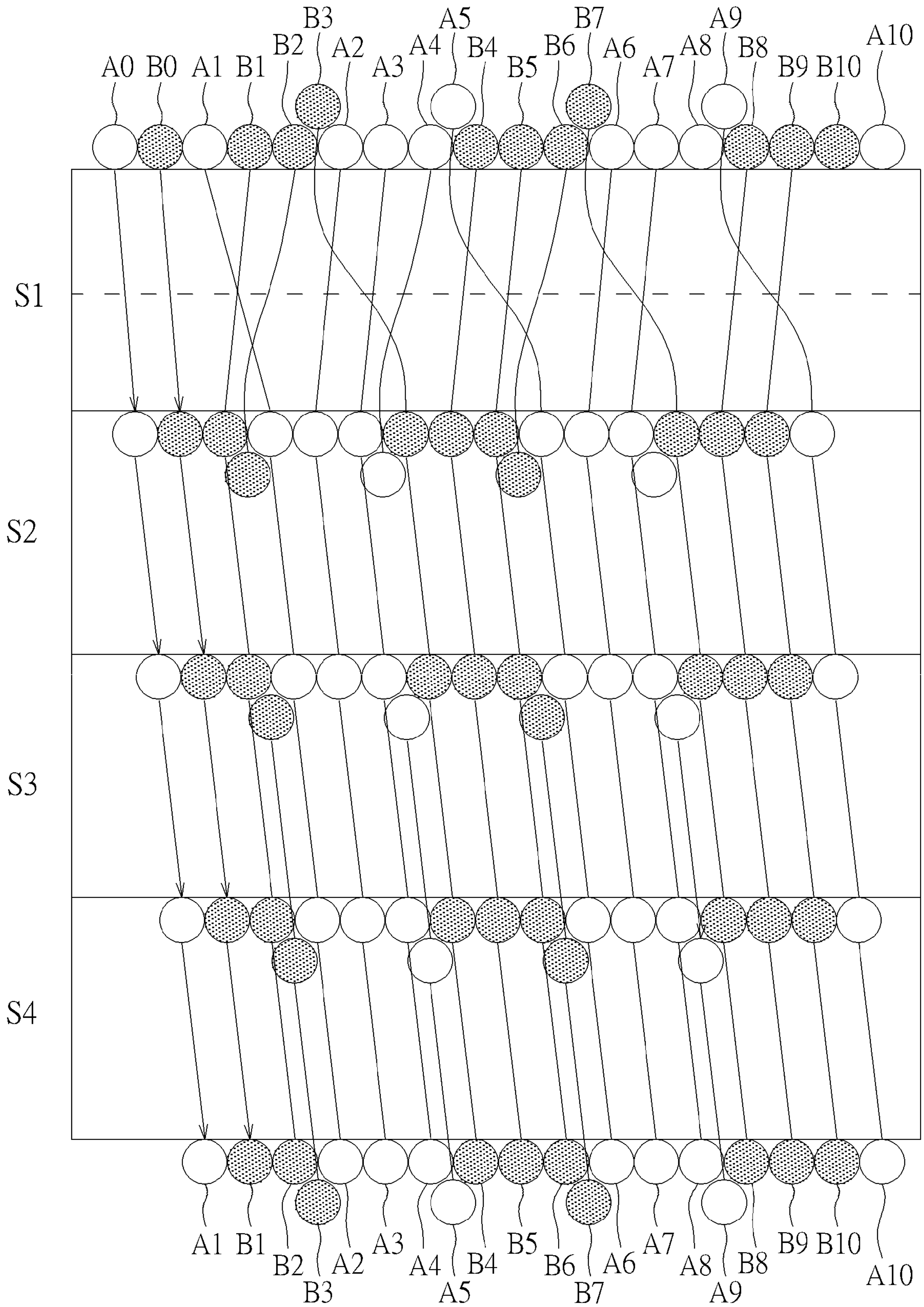
FIG. 2C shows an expansion view of the center limb of the common mode filter in FIG. 1.

FIGS. 2A and 2B show side views of the end portions 100 and 110, respectively, and FIG. 2C shows an expansion view of the center limb 120. The center limb 120 may be expanded into sides S1 to S4. A method of winding the wires w1 and w2 to arrive the winding structure in FIG. 1 will be explained as follows. The method includes Steps S21 to S29, and is explained with reference to FIGS. 2A to 2C. Any reasonable technological change or step adjustment is within the scope of the disclosure.

S21: Attach the starting ends of the wires w1 and w2 to the start terminal 101 and the start terminal 102, respectively, and fit the wire w1 and w2 around a groove g1 on a sidewall of the end portion 100, getting ready for winding;

S22: Wind the wires w1 and the wire w2 around the sides S1 to S4 in parallel to complete the turn A0 and the turn B0;

S23: Cross the turns A1 and B1 at the side S1, and then wind the turns A1 and B1 in parallel to complete the turns A1 and B1;

S24: Stack the turn B2 forwards at the groove between the turns A1 and B1 at the side S1 and then wind the turn B2 around the groove between the turns A1 and B1, and wind the turn A2 in parallel to the turn A1 and next to the center limb 120, so as to complete the turns A2 and B2;

S25: Wind the turn A3 in parallel to the turn A2 and next to the center limb 120, cross the turn B3 and the turns A2 and A3, and then wind the turn B3 in parallel to the turn A3 and next to the center limb 120, so as to complete the turns A3 and B3;

S26: Stack the turn A4 forwards at the groove between the turns A3 and B3 and then wind the turn B4 around the groove between the turns A3 and B3, and wind the turn B4 in parallel to the turn B3 and next to the center limb 120, so as to complete the turns A4 and B4;

S27: Wind the turn B5 in parallel to the turn B4 and next to the center limb 120, cross the turn A5 and the turns B4 and B5, and then wind the turn A5 in parallel to the turn B5 and next to the center limb 120, so as to complete the turns A5 and B5;

S28: Wind the turns A6 to A9 and the turns B6 to B9 according to the flow outlined in Steps S24 to S27; and S29: Fit the wire w1 and w2 around a groove g2 on a sidewall of the end portion 110, and attach the terminating ends of the wires w1 and w2 to the end terminal 111 and the end terminal 112, respectively.

In Step S21, windings of the wires w1 and w2 are started from the start terminal 101 and the start terminal 102, respectively, (FIG. 2A). The wire segments from the start terminals 101 and 102 to the starts of the turns A0 and B0 are referred to as start segments of the wires w1 and w2, respectively. In Step S22, the wire w1 and the wire w2 are wound in sequence to form the turns A1 and B1 (FIG. 2C). The center limb 120 is expanded to sides S1 to S4. At the side S1, the first quarter of a turn of the wire w1 or w2 is wound; at the side S2, the second quarter of the turn of the wire w1 or w2 is wound; at the side S3, the third quarter of the turn of the wire w1 or w2 is wound; and at the side S4, the fourth quarter of the turn of the wire w1 or w2 is wound. In Step S23, the turns A1 and B1 are crossed, exchanging the winding order of the wires w1 and w2. In Step S24, the turn B2 is stacked at the groove between the turns A1 and B1, forming an outer turn of the wire w2. The turn A2 and the turn B2 are wound separately for the most part. In Step S25, the turn B3 and the turns A2 and A3 are crossed, again exchanging the winding order of the wires w1 and w2. In Step S26, the turn A4 is stacked at the groove between the turns A3 and B3, forming an outer turn of the wire w1. The turn A4 and the turn B4 are wound separately for the most part. In Step S27, the turn A5 and the turns B4 and B5 are crossed, exchanging the winding order of the wires w1 and w2. Therefore, Steps S3 to S7 follow a repeated pattern of crossing and stacking to perform winding, and the repeated pattern continues in Step S28, resulting in equal numbers of inner turns (=9) and equal numbers of outer turns (=2) of the wire w1 and the wire w2, and the outer turn B3, B7 of the wire w2 and the outer turn A5, A9 of the wire w1 being arranged alternately according to a matching order, leading to equal winding inductances and equal capacitive couplings of the wires w1 and w2, thereby enhancing the noise immunity, increasing the mode conversion while reducing the phase difference of the differential signals over a wideband spectrum. In Step S29, the windings of the wires w1 and w2 are terminated at the end terminal 111 and the end terminal 112, respectively (FIG. 2B). The wire segments from the turns A1 and B10 to the end terminals 111 and 112 are referred to as end segments of the wires w1 and w2, respectively. Accordingly, both the windings of the wire w1 and the wire w2 are started from the end portion 100 and terminated at the end portion 110, providing matching input inductances of the start segments of the wire w1 and the wire w2 and matching output inductances of the end segments of the wire w1 and the wire w2, further enhancing the mode conversion over the wideband spectrum.

Figure 3A:
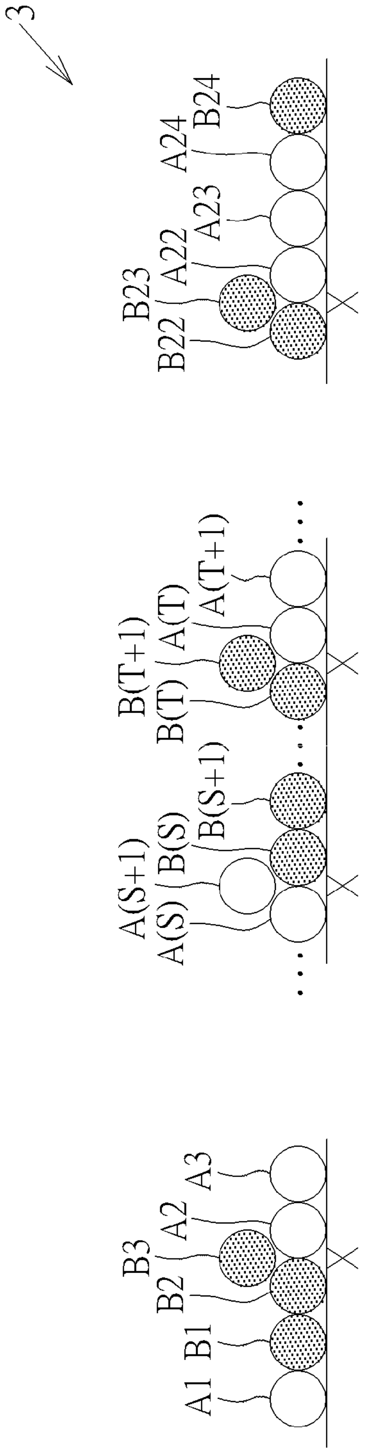
FIG. 3A shows a partial cross-sectional view of a common mode filter according to another embodiment of the invention.

FIG. 3A shows a partial cross-sectional view of a common mode filter 3 at the side S1 according to another embodiment of the invention. The common mode filter 3 is formed by a winding method similar to the common mode filter 1, except that each of the wires w1 and w2 is wound into 24 turns in the common mode filter 3.

The (S+1)th turn of the wire w1 may be stacked on the Sth turn of the wire w1 and the Sth turn of the wire w2, S being a positive integer less than (N−1), and the (T+1)th turn of the wire w2 may be stacked on the Tth turn of the wire w2 and the Tth turn of the wire w1, T being a positive integer less than (N−1) and different from S. For example, if T=2, S=4, the outer turn B3 (=2+1) may be stacked at the groove between the inner turn B2 and the inner turn A2, and the outer turn A5 (=4+1) may be stacked at the groove between the inner turn A4 and the inner turn B4.

The (S+1)th turn of the wire w1 and the (S+1)th turn of the wire w2 may cross each other, and the (T+1)th turn of the wire w1 and the (T+1)th turn of the wire w2 may cross each other, (S+1) and (T+1) being different odd numbers, so as to achieve the symmetrical structure of the wires w1 and w2. For example, if (T+1)=3, (S+1)=5, the turn B3 and the turn A3 cross each other, and the turn A5 and the turn B5 cross each other.

In FIG. 3A, a cross indicates a winding order exchange. For example, the cross between the turns B2 and A2 indicates that the winding order is changed from winding the wire w2 followed by the wire w1 (B2 then A2) to winding the wire w1 followed by the wire w2 (A3 then B3), and the cross between the turns A(S) and B(S) indicates that the winding order is changed from winding the wire w1 followed by the wire w2 (A(S) then B(S)) to winding the wire w2 followed by the wire w1 (B(S+1) then A(S+1)).

The wire w1 forms 19 inner turns and 5 outer turns (A5, A9, A13, A17, A21), and the wire w2 forms 18 inner turns and 6 outer turns (B3, B7, B11, B15, B19, B23), adding up to 37 inner turns and 11 outer turns of the common mode filter 3. Therefore, the number of the inner turns of the wire w1 is substantially equal to the number of the inner turns of the wire w2 (18≈19), and the number of the outer turns of the wire w1 is substantially equal to the number of the outer turns of the wire w2 (5≈6), resulting in approximately equal winding inductances of the wires w1 and w2 regardless of changes in the data rate and the magnetic permeability, being favorable for a high-speed transmission.

Figure 3B:
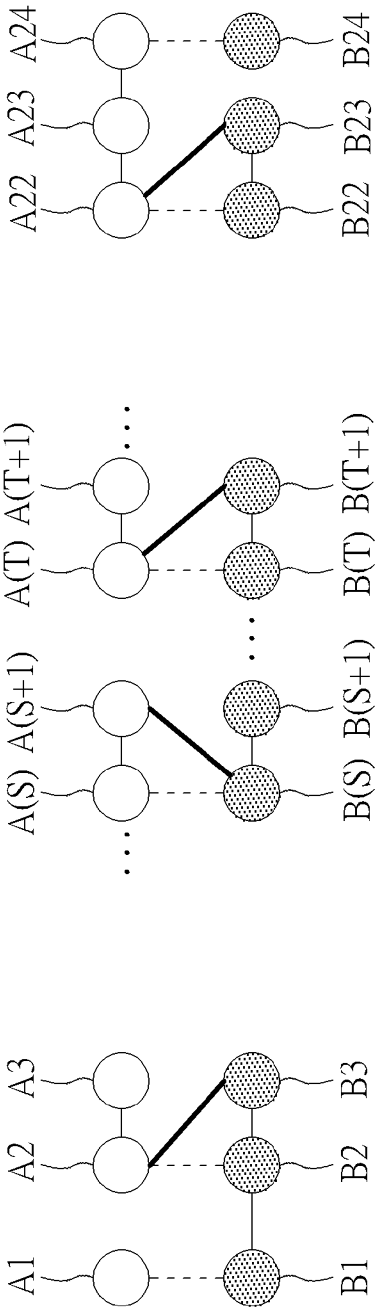
FIG. 3B shows a schematic diagram of capacitive coupling of the common mode filter in FIG. 3A.

Since each differential signal generates a voltage drop across a turn of the wire w1 or w2, a potential difference will be present between different turns of the wire w1 and/or the wire w2, resulting in capacitive coupling between adjacent turns. FIG. 3B shows a schematic diagram of capacitive coupling of the common mode filter 3. In FIG. 3B, a thick line indicates directional capacitive coupling between different turns of the wires w1 and w2, a thin line indicates directional capacitive coupling between different turns of the wire w1 or w2, and a dashed line indicates capacitive coupling between matching turns of the wires w1 and w2.

For example, the thick line between the turn B(S) and the turn A(S+1) indicates that directional capacitive coupling is present between the turn B(S) and the turn A(S+1) owing to a potential difference therebetween, inducing a first coupling current between the turn B(S) and the turn A(S+1). The thick line between the turn A(T) and the turn B(T+1) indicates that directional capacitive coupling is present between the turn A(T) and the turn B(T+1) owing to a potential difference therebetween, inducing a second coupling current between the turn A(T) and the turn B(T+1). The first coupling current and the second coupling current may be opposite in direction and may cancel each other out to achieve a compensation. The compensation may be done in the high-speed transmission without significantly affecting the phase difference between the differential signals if S and T stay close to each other. In some embodiments, an absolute difference |T−S| between T and S may be equal to a positive even number. If T=3, S=5, the absolute difference |T−S| is equal to 2, achieving no or little change in the phase difference between the differential signals regardless of the data rate. The smaller the absolute difference is, the smaller the phase difference between the differential signals will be.

Further, the thin line between the turn A(S) and the turn A(S+1) indicates directional capacitive coupling from the turn A(S) to the turn A(S+1) owing to the turn A(S) is at a higher potential then the turn A(S+1), and the thin line between the turn B(S) and the turn B(S+1) indicates directional capacitive coupling from the turn B(S) to the turn B(S+1) since the turn B(S) is at a higher potential then the turn B(S+1). Since the amount of capacitive coupling from the turn A(S) to the turn A(S+1) is equal to the amount of capacitive coupling from the turn B(S) to the turn B(S+1), the phase difference between the differential signals remains unchanged.

As for the dashed line between the turn A(S) and the turn B(S), since the turn A(S) is at the same potential as the turn B(S), no capacitive coupling is generated between turn A(S) and the turn B(S).

Therefore, the capacitive coupling in the common mode filter 3 generates no or little change in the phase difference between the differential signals regardless of the data rate.

In some embodiments, one or more of the 5 outer turns (A5, A9, A13, A17, A21) of the wire w1 and the 6 outer turns (B3, B7, B11, B15, B19, B23) of the wire w2 may be shifted forwards to reduce the capacitive coupling between the wires w1 and w2. For example, referring to FIGS. 3A and 3B, the turn B3 may be shifted forwards by one turn to rest at the groove between the turns B1 and B2. As a result, the capacitive coupling between the turns B3 and A2 is no longer present, and capacitive coupling between the turns B3 and B1 is introduced. Accordingly, the self-capacitance of the wire w2 is increased, and the cross-coupling capacitance between the wires w1 and w2 is reduced, reducing the transit time (rising time/falling time) of the differential signals, reducing signal distortion of the differential signals, being favorable for a bus-line or multi-drop network.

In other embodiments, one or more of the 5 outer turns (A5, A9, A13, A17, A21) of the wire w1 and the 6 outer turns (B3, B7, B11, B15, B19, B23) of the wire w2 may be shifted backwards to increase the amount of the capacitive coupling between the wires w1 and w2. For example, referring to FIGS. 3A and 3B, the turn B3 may be shifted backwards by one turn to rest at the groove between the turns A2 and A3. As a result, the capacitive coupling between the turns B3 and B2 is no longer present, and the capacitive coupling between the turns B3 and A3 is introduced. Accordingly, the self-capacitance of the wire w2 is decreased, the cross-coupling capacitance between the wires w1 and w2 is increased to a suitable value for impedance matching, being favorable for impedance matching between the output of the common mode filter 3 and an external transmission system.

In other embodiments, one or more of the 5 outer turns (A5, A9, A13, A17, A21) of the wire w1 and the 6 outer turns (B3, B7, B11, B15, B19, B23) of the wire w2 may be shifted forwards, and one or more of the remaining outer turns of the wires w1 and w2 may be shifted backwards to achieve desirable cross-coupling capacitance between the wires w1 and w2, desirable self-capacitance of the wire w1 and desirable self-capacitance of the wire w2.

Figure 4A:
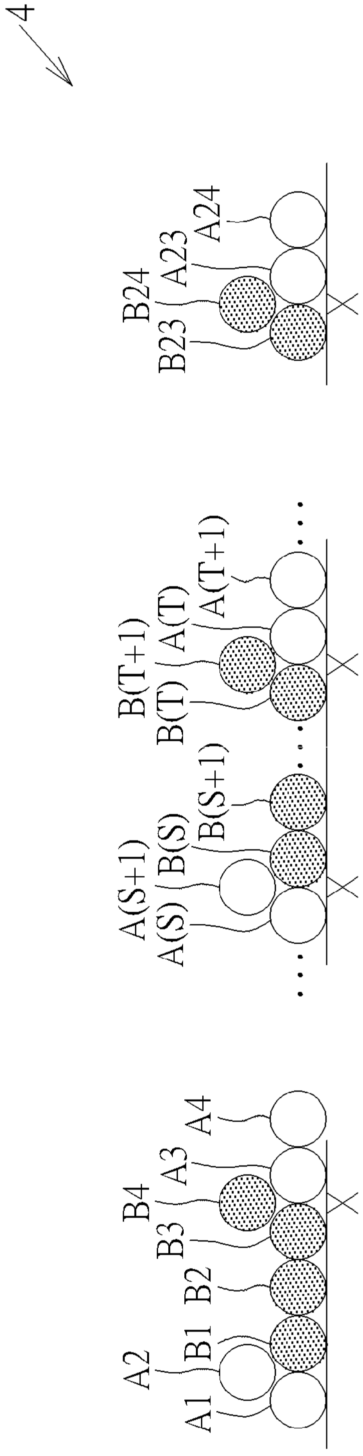
FIG. 4A shows a partial cross-sectional view of a common mode filter according to another embodiment of the invention.

FIG. 4A shows a partial cross-sectional view of a common mode filter 4 according to another embodiment of the invention. The common mode filter 4 has a winding structure similar to the common mode filter 3, except that the outer turns of the wires w1 and w2 are led by the turn A2 of the wire w1 in the common mode filter 4 rather than the turn B3 of the wire w2 in the common mode filter 3, increasing one outer turn for the wire w1 and increasing symmetry of the winding structure. The winding structure of the common mode filter 4 may be produced by a repeated pattern of stacking and crossing. Each of the wires w1 and w2 may form 24 turns in the common mode filter 4.

The (S+1)th turn of the wire w1 may be stacked on the Sth turn of the wire w1 and the Sth turn of the wire w2, S being a positive integer less than (N−1), and the (T+1)th turn of the wire w2 may be stacked on the Tth turn of the wire w2 and the Tth turn of the wire w1, T being a positive integer less than (N−1) and different from S. For example, if S=1, T=3, the outer turn A2 (=1+1) may be stacked at the groove between the inner turn A1 and the inner turn B1, and the outer turn B4 (=3+1) may be stacked at the groove between the inner turn B3 and the inner turn A3.

The (S+1)th turn of the wire w1 and the (S+1)th turn of the wire w2 may cross each other, and the (T+1)th turn of the wire w1 and the (T+1)th turn of the wire w2 may cross each other, (S+1) and (T+1) being different positive even numbers, so as to achieve the symmetrical winding structure of the wires w1 and w2. For example, if (S+1)=2, (T+1)=4, the turn A2 and the turn B2 cross each other, and the turn B4 and the turn A4 cross each other.

In FIG. 4A, a cross indicates a winding order exchange. For example, the cross between the turns A(S) and B(S) indicates that the winding order is changed from winding the wire w1 followed by the wire w2 (A(S) then B(S)) to winding the wire w2 followed by the wire w1 (B(S+1) then A(S+1)), and the cross between the turns B(T) and A(T) indicates that the winding order is changed from winding the wire w2 followed by the wire w1 (B(T) then A(T)) to winding the wire w1 followed by the wire w2 (A(T+1) then B(T+1)).

The wire w1 forms 18 inner turns and 6 outer turns (A2, A6, A10, A14, A18, A22), and the wire w2 forms 18 inner turns and 6 outer turns (B4, B8, B12, B16, B20, B24), adding up to 36 inner turns and 12 outer turns of the common mode filter 4. Therefore, the number of the inner turns of the wire w1 is equal to the number of the inner turns of the wire w2 (18=18), and the number of the outer turns of the wire w1 is equal to the number of the outer turns of the wire w2 (6=6), resulting in equal winding inductances of the wires w1 and w2 regardless of changes in the data rate and the magnetic permeability, being favorable for a high-speed transmission.

Figure 4B:
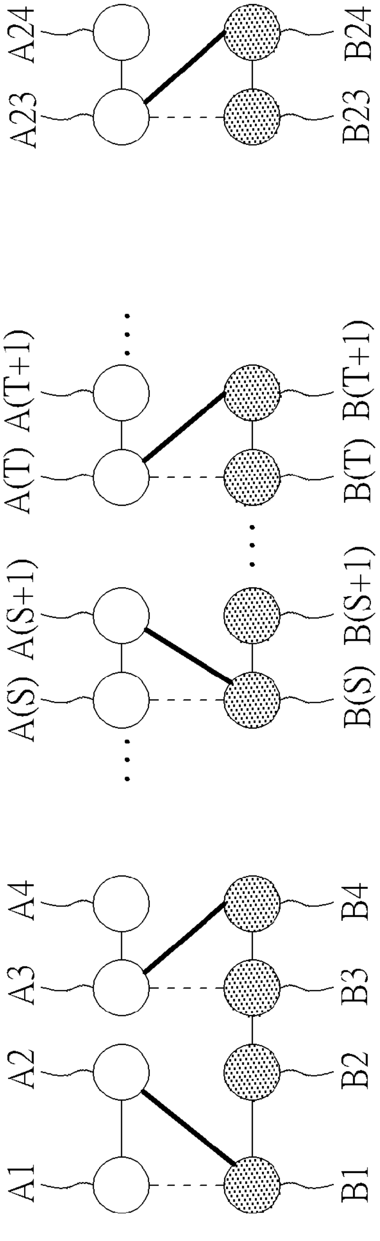
FIG. 4B shows a schematic diagram of capacitive coupling of the common mode filter in FIG. 4A.

FIG. 4B shows a schematic diagram of capacitive coupling of the common mode filter 4. In FIG. 4B, a thick line indicates directional capacitive coupling between different turns of the wires w1 and w2, a thin line indicates directional capacitive coupling between different turns of the wire w1 or w2, and a dashed line indicates capacitive coupling between matching turns of the wires w1 and w2.

Similar to FIG. 3B, the directional capacitive coupling between the turn B(S) and the turn A(S+1) may be compensated by the directional capacitive coupling between the turn A(T) and the turn B(T+1) in a high-speed transmission, resulting in no or little change to the phase difference between the differential signals if S and T stay close to each other. In some embodiments, an absolute difference |T−S| between T and S may be equal to a positive even number. If T=3, S=1, the absolute difference |T−S| is equal to 2. The smaller the absolute difference is, the smaller the phase difference between the differential signals will be. The directional capacitive coupling in the wire w1 or w2 (thin lines) or the zero capacitive coupling between the wires w1 and w2 (dashed lines) in FIG. 4B are similar to FIG. 3B, and the explanation therefor is omitted here for brevity.

Therefore, the capacitive coupling in the common mode filter 4 generates no or little change in the phase difference between the differential signals regardless of the data rate. Further, the common mode filter 4 offers one more outer turn and one less inner turn than the common mode filter 3, decreasing the construction size, increasing the symmetry of the winding structure while enhancing the mode conversion.

Figure 5A:
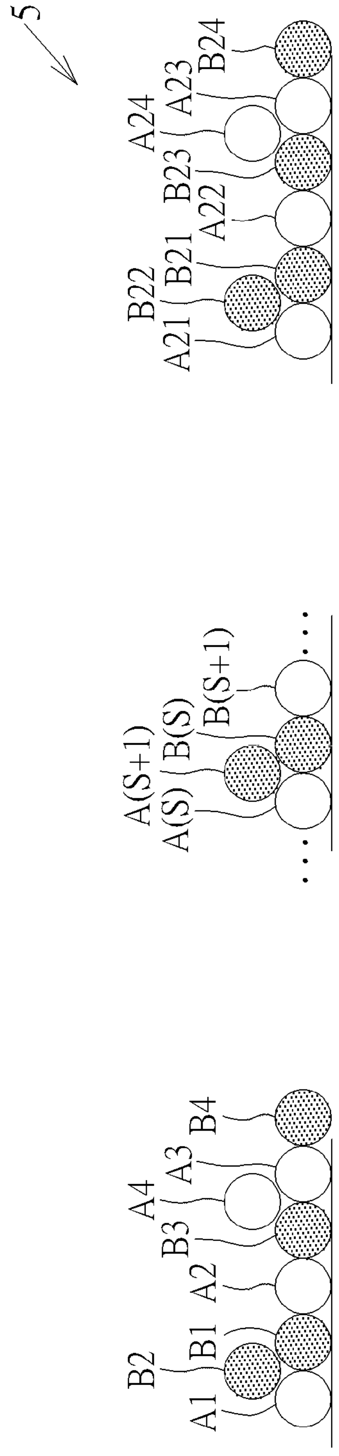
FIG. 5A shows a partial cross-sectional view of a common mode filter according to another embodiment of the invention.

FIG. 5A shows a partial cross-sectional view of a common mode filter 5 according to another embodiment of the invention. The common mode filter 5 has a winding structure similar to the common mode filter 4, except that the outer turns of the wires w1 and w2 are led by the turn B2 of the wire w2 in the common mode filter 5 rather than the turn A2 of the wire w1 in the common mode filter 4. The winding structure of the common mode filter 5 may be produced by alternately performing simultaneously stacking and crossing on consecutive even turns of the wires w1 and w2, and winding odd turns of the wires w1 and w2 around and next to the center limb 120. Each of the wires w1 and w2 may form 24 turns in the common mode filter 5.

The (S+1)th turn of the wire w1 or w2 may be stacked on the Sth turn of the wire w1 and the Sth turn of the wire w2, S being a positive odd integer less than (N−1). For example, if S=1, the outer turn B2 (=1+1) may be stacked at the groove between the inner turn A1 and the inner turn B1, and if S=3, the outer turn A4 (=3+1) may be stacked at the groove between the inner turn B3 and the inner turn A3. The closer two outer turns of the common mode filter 5 is, the smaller the phase difference between the differential signals will be.

The (S+1)th turn of the wire w1 and the Sth turn of the wire w1 may cross each other, or the (S+1)th turn of the wire w2 and the Sth turn of the wire w2 may cross each other, (S+1) being a positive even number, achieving the symmetrical winding structure of the wires w1 and w2, and resulting in the mode conversion similar to common mode filter 4. For example, if (S+1)=2, the turn B2 and the turn B1 cross each other, and if (S+1)=4, the turn A4 and the turn A3 cross each other.

The wire w1 forms 18 inner turns and 6 outer turns (A4, A8, A12, A16, A20, A24), and the wire w2 forms 18 inner turns and 6 outer turns (B2, B6, B10, B14, B18, B22), adding up to 36 inner turns and 12 outer turns of the common mode filter 5. Therefore, the number of the inner turns of the wire w1 is equal to the number of the inner turns of the wire w2 (18=18), and the number of the outer turns of the wire w1 is equal to the number of the outer turns of the wire w2 (6=6), resulting in equal winding inductances of the wires w1 and w2 regardless of changes in the data rate and the magnetic permeability, being favorable for a high-speed transmission.

The 36 inner turns of the common mode filter 5 includes 18 inner turns of the wire w1 and 18 inner turns of the wire w2 alternately arranged. That is, each inner turn other than the turn A1 of the wire w1 is adjacent on either side to an inner turn of the wire w2, and each inner turn other than the turn B24 of the wire w2 is adjacent on either side to an inner turn of the wire w1. Consequently, the cross-coupling capacitance between the wires w1 and w2 of the common mode filter 5 is approximately twice that of the common mode filter 3, being favorable for impedance matching.

Figure 5B:
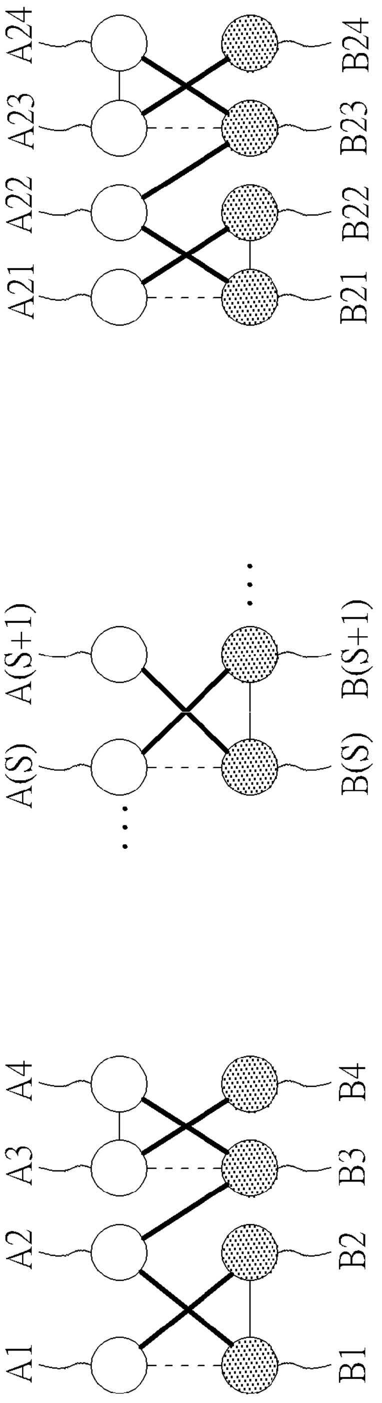
FIG. 5B shows a schematic diagram of capacitive coupling of the common mode filter in FIG. 5A.

FIG. 5B shows a schematic diagram of capacitive coupling of the common mode filter 5. In FIG. 5B, a thick line indicates directional capacitive coupling between different turns of the wires w1 and w2, a thin line indicates directional capacitive coupling between different turns of the wire w1 or w2, and a dashed line indicates capacitive coupling between matching turns of the wires w1 and w2.

The directional capacitive coupling between the turn B(S) and the turn A(S+1) may be compensated by the directional capacitive coupling between the turn A(S) and the turn B(S+1) in a high-speed transmission, resulting in no or little change to the phase difference between the differential signals. The directional capacitive coupling in the wire w1 or w2 (thin lines) or the zero capacitive coupling between the wires w1 and w2 (dashed lines) in FIG. 5B are similar to FIG. 3B, and the explanation therefor is omitted here for brevity.

The capacitive coupling in the common mode filter 5 generates no or little change in the phase difference between the differential signals regardless of the data rate. Further, the common mode filter 5 offers one more outer turn and one less inner turn than the common mode filter 3, decreasing the construction size, increasing the symmetry of the winding structure while enhancing the mode conversion.

Figure 6A:
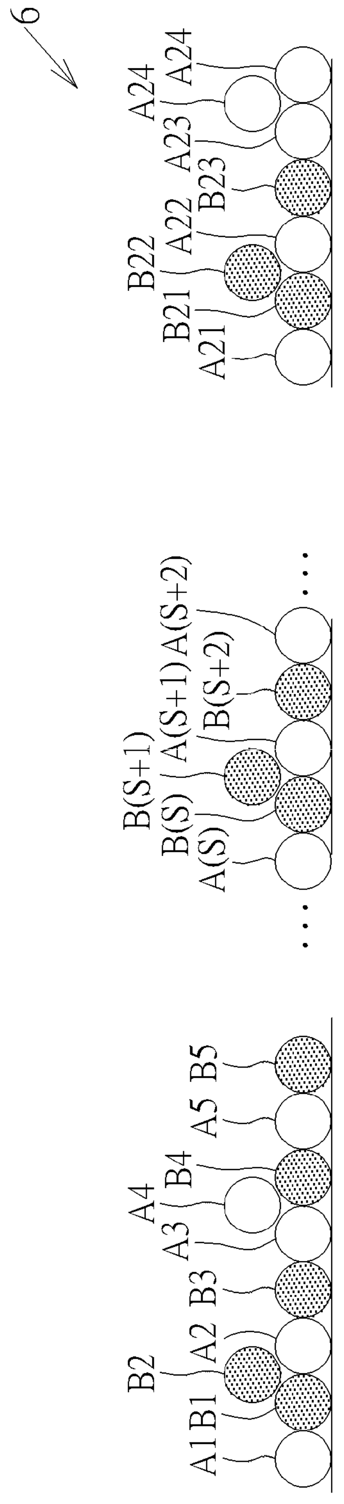
FIG. 6A shows a partial cross-sectional view of a common mode filter according to another embodiment of the invention.

FIG. 6A shows a partial cross-sectional view of a common mode filter 6 according to another embodiment of the invention. The common mode filter 6 has a winding structure similar to the common mode filter 5, except that each outer turn in the common mode filter 5 is shifted backwards by one turn to arrive the common mode filter 6. The winding structure of the common mode filter 6 may be produced by alternately performing simultaneously stacking and crossing on consecutive even turns of the wires w1 and w2, and winding odd turns of the wires w1 and w2 around and next to the center limb 120. Each of the wires w1 and w2 may form 24 turns in the common mode filter 6.

In some embodiments, the (S+1)th turn of the wire w1 may be stacked on the Sth turn of the wire w1 and the (S+1)th turn of the wire w2, and the (S+2)th turn of the wire w1 may be wound around the center limb 120 in parallel to the (S+1)th turn of the wire w2, S being a positive odd integer less than (N−2). In other embodiments, the (S+1)th turn of the wire w2 may be stacked on the Sth turn of the wire w2 and the (S+1)th turn of the wire w1, and the (S+2)th turn of the wire w2 may be wound around the center limb 120 in parallel to the (S+1)th turn of the wire w1, S being a positive odd integer less than (N−1). For example, if S=1, the outer turn B2 (=1+1) may be stacked at the groove between the inner turn B1 and the inner turn A2, and the inner turn B3 is wound around the center limb 120 in parallel to the inner turn A2. If S=3, the outer turn A4 (=3+1) may be stacked at the groove between the inner turn A3 and the inner turn B4, and the inner turn A5 is wound around the center limb 120 in parallel to the inner turn B4. The closer two outer turns of the common mode filter 6 is, the smaller the phase difference between the differential signals will be.

In some embodiments, the (S+1)th turn of the wire w1 and the Sth turn of the wire w2 may cross each other, and the (S+1)th turn of the wire w1 and the (S+2)th turn of the wire w2 may cross each other, (S+1) being a positive even number. For example, if (S+1)=4, the turn A4 and the turn B3 cross each other, and the turn A4 and the turn B5 cross each other. In other embodiments, the (S+1)th turn of the wire w2 and the Sth turn of the wire w1 may cross each other, and the (S+1)th turn of the wire w2 and the (S+2)th turn of the wire w1 may cross each other, (S+1) being a positive even number. For example, if (S+1)=2, the turn B2 and the turn A1 cross each other, and the turn B2 and the turn A3 cross each other. As a consequence, a symmetrical winding structure of the wires w1 and w2 is achieved, resulting in the mode conversion similar to common mode filters 4 and 5.

The wire w1 forms 18 inner turns and 6 outer turns (A4, A8, A12, A16, A20, A24), and the wire w2 forms 18 inner turns and 6 outer turns (B2, B6, B10, B14, B18, B22), adding up to 36 inner turns and 12 outer turns of the common mode filter 6. Therefore, the number of the inner turns of the wire w1 is equal to the number of the inner turns of the wire w2 (18=18), and the number of the outer turns of the wire w1 is equal to the number of the outer turns of the wire w2 (6=6), resulting in equal winding inductances of the wires w1 and w2 regardless of changes in the data rate and the magnetic permeability, being favorable for a high-speed transmission.

The arrangement of the 36 inner turns of the common mode filter 6 is similar to the common mode filter 5, and consequently, the cross-coupling capacitance between the wires w1 and w2 of the common mode filter 6 is also approximately twice that of the common mode filter 3, being favorable for impedance matching.

Figure 6B:
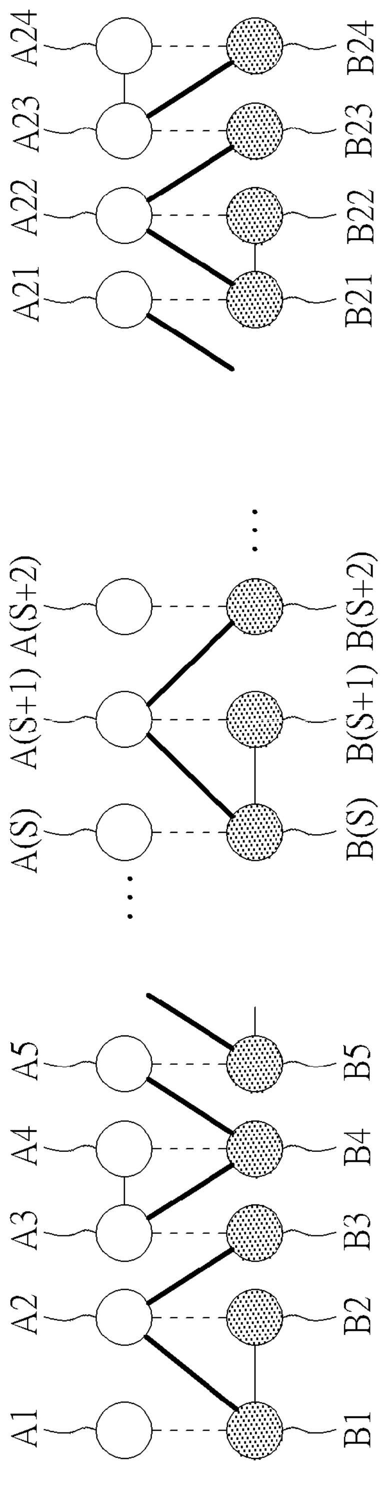
FIG. 6B shows a schematic diagram of capacitive coupling of the common mode filter in FIG. 6A.

FIG. 6B shows a schematic diagram of capacitive coupling of the common mode filter 6. In FIG. 6B, a thick line indicates directional capacitive coupling between different turns of the wires w1 and w2, a thin line indicates directional capacitive coupling between different turns of the wire w1 or w2, and a dashed line indicates capacitive coupling between matching turns of the wires w1 and w2.

The directional capacitive coupling between the turn B(S) and the turn A(S+1) may be compensated by the directional capacitive coupling between the turn A(S+1) and the turn B(S+2) in a high-speed transmission, resulting in no or little change to the phase difference between the differential signals. The directional capacitive coupling in the wire w1 or w2 (thin lines) or the zero capacitive coupling between the wires w1 and w2 (dashed lines) in FIG. 6B are similar to FIG. 3B, and the explanation therefor is omitted here for brevity.

The capacitive coupling in the common mode filter 6 generates no or little change in the phase difference between the differential signals regardless of the data rate. Further, the common mode filter 6 offers one more outer turn and one less inner turn than the common mode filter 3, decreasing the construction size, increasing the symmetry of the winding structure while enhancing the mode conversion.

Figure 7A:
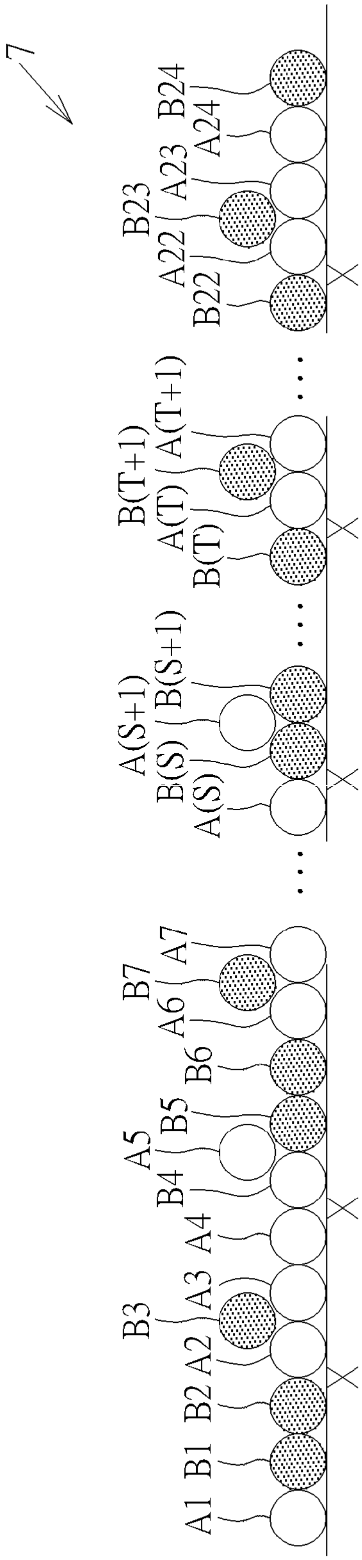
FIG. 7A shows a partial cross-sectional view of a common mode filter according to another embodiment of the invention.

FIG. 7A shows a partial cross-sectional view of a common mode filter 7 according to another embodiment of the invention. The common mode filter 7 has a winding structure similar to the common mode filter 3, except that each outer turn in the common mode filter 3 is shifted backwards by one turn to arrive the common mode filter 7. The winding structure of the common mode filter 7 may be produced by a winding method similar to the common mode filter 3. Each of the wires w1 and w2 may form 24 turns in the common mode filter 7.

The (S+1)th turn of the wire w1 may be stacked on the Sth turn of the wire w2 and the (S+1)th turn of the wire w2, S being a positive integer less than (N−1). For example, if S=4, the outer turn A5 (=4+1) may be stacked at the groove between the inner turn B4 and the inner turn B5. Further, the (T+1)th turn of the wire w2 may be stacked on the Tth turn of the wire w1 and the (T+1)th turn of the wire w1, T being a positive integer less than (N−1). For example, if T=2, the outer turn B3 (=2+1) may be stacked at the groove between the inner turn A3 and the inner turn A4.

The (S+1)th turn of the wire w1 and the (S+1)th turn of the wire w2 may cross each other, and the (T+1)th turn of the wire w1 and the (T+1)th turn of the wire w2 may cross each other, (S+1) and (T+1) being different odd numbers, so as to achieve the symmetrical structure of the wires w1 and w2. For example, if (T+1)=3, (S+1)=5, the turn B3 and the turn A3 cross each other, and the turn A5 and the turn B5 cross each other.

The wire w1 forms 19 inner turns and 5 outer turns, and the wire w2 forms 18 inner turns and 6 outer turns, adding up to 37 inner turns and 11 outer turns of the common mode filter 7. Therefore, the number of the inner turns of the wire w1 is substantially equal to the number of the inner turns of the wire w2 (18≈19), and the number of the outer turns of the wire w1 is substantially equal to the number of the outer turns of the wire w2 (5≈6), resulting in equal winding inductances of the wires w1 and w2 regardless of changes in the data rate and the magnetic permeability, being favorable for a high-speed transmission.

In the common mode filter 7, each outer turn of the wire w1 is stacked on 2 inner turns of the wire w2, and each outer turn of the wire w2 is stacked on 2 inner turns of the wire w1, and consequently, the cross-coupling capacitance between the wires w1 and w2 of the common mode filter 7 is increased to approximately 1.5 times that of the common mode filter 3, being favorable for impedance matching.

Figure 7B:
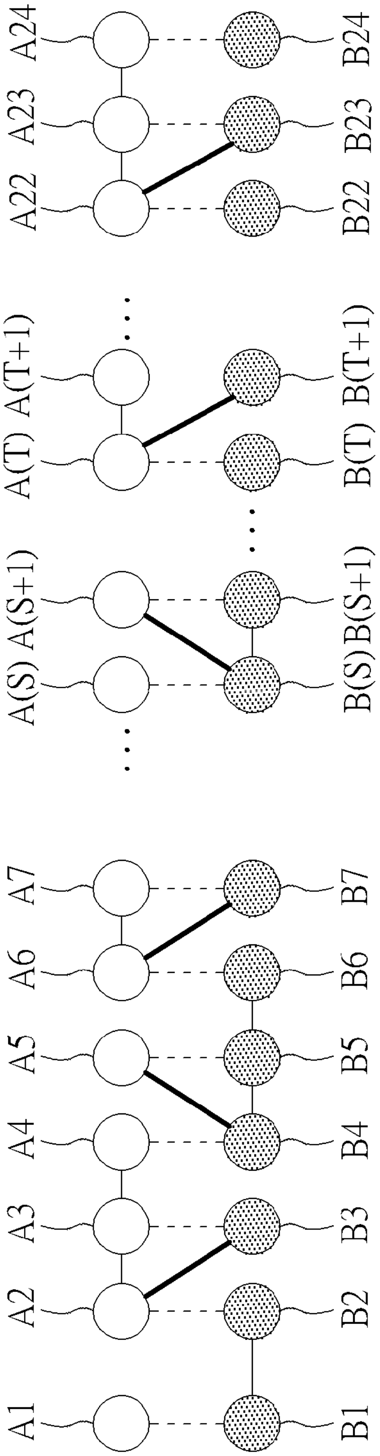
FIG. 7B shows a schematic diagram of capacitive coupling of the common mode filter in FIG. 7A.

FIG. 7B shows a schematic diagram of capacitive coupling of the common mode filter 7. In FIG. 7B, a thick line indicates directional capacitive coupling between different turns of the wires w1 and w2, a thin line indicates directional capacitive coupling between different turns of the wire w1 or w2, and a dashed line indicates capacitive coupling between matching turns of the wires w1 and w2.

The directional capacitive coupling between the turn B(S) and the turn A(S+1) may be compensated by the directional capacitive coupling between the turn A(T) and the turn B(T+1) in a high-speed transmission, resulting in no or little change to the phase difference between the differential signals if S and T stay close to each other. In some embodiments, an absolute difference |T−S| between T and S may be equal to an even number. For example, if T=3, S=5, the absolute difference |T−S| is equal to 2. The smaller the absolute difference is, the smaller the phase difference between the differential signals will be.

Referring to FIGS. 3B and 7B, the outer turn B3 is capacitively coupled to the inner turns A2 and A3 in the common mode filter 7 rather than to the inner turns B2 and A3 as in the common mode filter 3, and the same principle is also applied to other outer turns. Compared to the common mode filter 3, the cross-coupling capacitance between the wires w1 and w2 is increased while decreasing self-capacitances of the wires w1 and w2 of the common mode filter 7.

Since the self-capacitances of the wire w1 and w2 (thin lines) are decreased by equal amounts, and the capacitive coupling between the wires w1 and w2 (dashed lines) is 0, the capacitive coupling of the common mode filter 7 remains symmetrical, offering the same mode conversion as in the common mode filter 3.

The capacitive coupling in the common mode filter 7 generates no or little change in the phase difference between the differential signals regardless of the data rate. Further, the common mode filter 7 provides a substantially symmetrical winding structure while enhancing the mode conversion over a wideband spectrum.

Figure 8A:
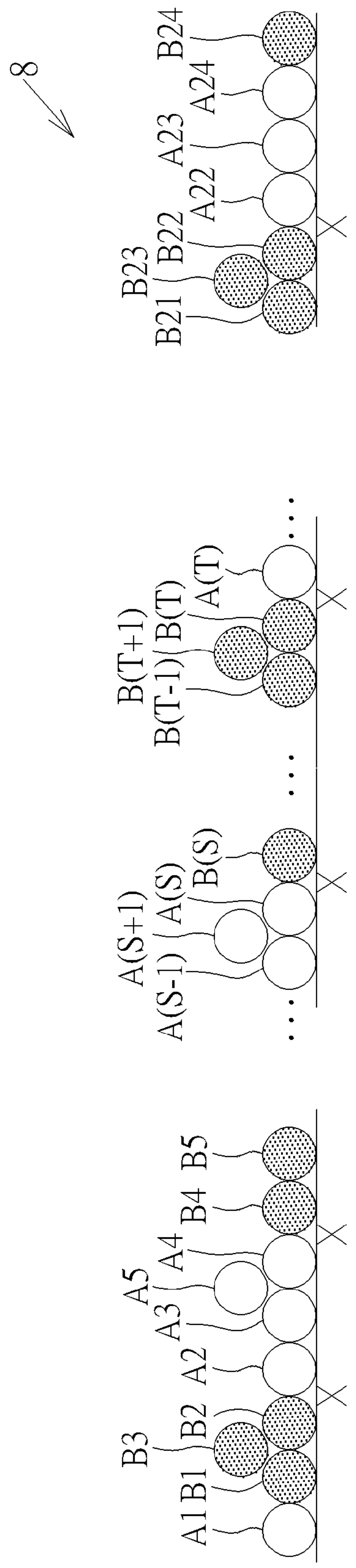
FIG. 8A shows a partial cross-sectional view of a common mode filter according to another embodiment of the invention.

FIG. 8A shows a partial cross-sectional view of a common mode filter 8 according to another embodiment of the invention. The common mode filter 8 has a winding structure similar to the common mode filter 3, except that each outer turn in the common mode filter 3 is shifted forwards by one turn to arrive the common mode filter 8. The winding structure of the common mode filter 8 may be produced by a winding method similar to the common mode filter 3. Each of the wires w1 and w2 may form 24 turns in the common mode filter 8.

The (S+1)th turn of the wire w1 may be stacked on the (S−1)th turn of the wire w1 and the Sth turn of the wire w1, S being a positive integer exceeding 1 and less than (N−1). For example, if S=4, the outer turn A5 (=4+1) may be stacked at the groove between the inner turn A3 and the inner turn A4. Further, the (T+1)th turn of the wire w2 may be stacked on the (T−1)th turn of the wire w2 and the Tth turn of the wire w2, T being a positive integer less than (N−1) and different from S. For example, if T=2, the outer turn B3 (=2+1) may be stacked at the groove between the inner turn B1 and the inner turn B2. In some embodiments, an absolute difference |T−S| between T and S may be equal to an even number. For example, if T=3, S=5, the absolute difference |T−S| is equal to 2. The smaller the absolute difference is, the smaller the phase difference between the differential signals will be.

The (S+1)th turn of the wire w1 and the (S+1)th turn of the wire w2 may cross each other, and the (T+1)th turn of the wire w1 and the (T+1)th turn of the wire w2 may cross each other, (S+1) and (T+1) being different odd numbers, so as to achieve the symmetrical structure of the wires w1 and w2. For example, if (T+1)=3, (S+1)=5, the turn B3 and the turn A3 cross each other, and the turn A5 and the turn B5 cross each other.

The wire w1 forms 19 inner turns and 5 outer turns, and the wire w2 forms 18 inner turns and 6 outer turns, adding up to 37 inner turns and 11 outer turns of the common mode filter 8. Therefore, the number of the inner turns of the wire w1 is substantially equal to the number of the inner turns of the wire w2 (18≈19), and the number of the outer turns of the wire w1 is substantially equal to the number of the outer turns of the wire w2 (5≈6), resulting in equal winding inductances of the wires w1 and w2 regardless of changes in the data rate and the magnetic permeability, being favorable for a high-speed transmission.

In the common mode filter 8, each outer turn of the wire w1 is stacked on 2 inner turns of the wire w1, and each outer turn of the wire w2 is stacked on 2 inner turns of the wire w2, and consequently, the cross-coupling capacitance between the wires w1 and w2 of the common mode filter 8 is decreased to approximately 0.5 time that of the common mode filter 3, being favorable in a bus-line or multi-drop network.

Figure 8B:
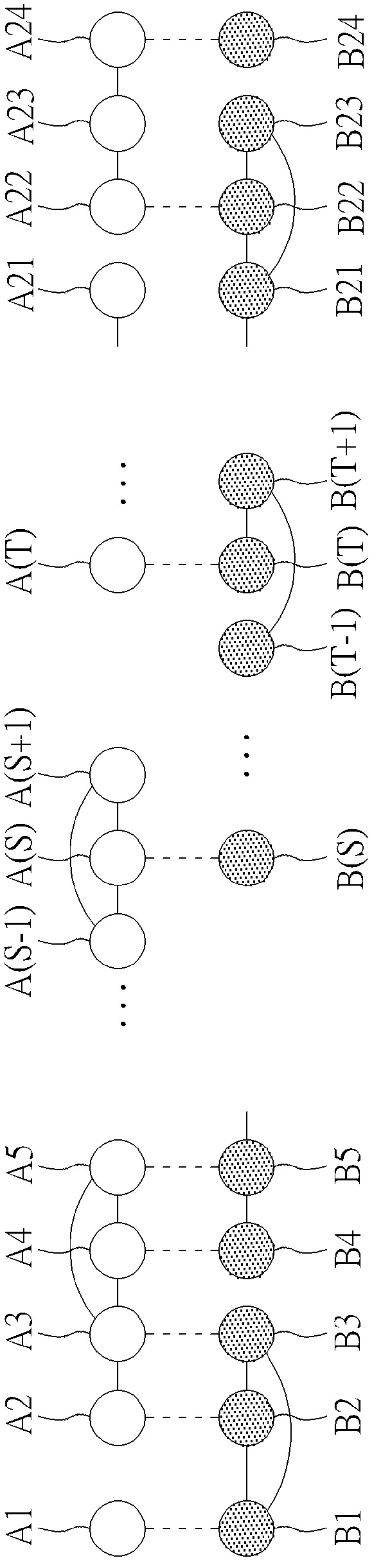
FIG. 8B shows a schematic diagram of capacitive coupling of the common mode filter in FIG. 8A.

FIG. 8B shows a schematic diagram of capacitive coupling of the common mode filter 8. In FIG. 8B, a thick line indicates directional capacitive coupling between different turns of the wires w1 and w2, a thin line indicates directional capacitive coupling between different turns of the wire w1 or w2, and a dashed line indicates capacitive coupling between matching turns of the wires w1 and w2.

Since each outer turn of the wire w1 or w2 is stacked on 2 inner turns of the same wire, there is no directional capacitive coupling between the wires w1 and w2, resulting in no or little change to the phase difference between the differential signals.

Referring to FIGS. 3B and 8B, the outer turn B3 is capacitively coupled to the inner turns B2 and B3 in the common mode filter 8 rather than to the inner turns B2 and A3 as in the common mode filter 3, and the same principle is also applied to other outer turns. Compared to the common mode filter 3, the cross-coupling capacitance between the wires w1 and w2 is decreased while increasing self-capacitances of the wires w1 and w2 of the common mode filter 8.

Since the self-capacitances of the wire w1 and w2 (thin lines) are increased by equal amounts, and the capacitive coupling between the wires w1 and w2 (dashed lines) is 0, the capacitive coupling of the common mode filter 8 remains symmetrical, offering the same mode conversion as in the common mode filter 3.

The capacitive coupling in the common mode filter 8 generates no or little change in the phase difference between the differential signals regardless of the data rate. Further, the common mode filter 8 provides a substantially symmetrical winding structure while enhancing the mode conversion over a wideband spectrum.

While each of the wires w1 and w2 forms 24 turns in the common mode filters 3 to 8, those skilled in the art would recognize that the wires w1 and w2 may form other numbers of turns to satisfy the design constraints and application requirements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A common mode filter for receiving a pair of differential signals comprising:

a magnetic core;

a first wire wound around the magnetic core and comprising N turns, N being an integer exceeding 1; and a second wire wound around the magnetic core and comprising N turns;

wherein:

an (S+1)th turn of the first wire is stacked on an Sth turn of the first wire and an Sth turn of the second wire, S being a positive integer less than (N−1), wherein the Sth turn of the first wire and the Sth turn of the second wire are wound in a first layer around the magnetic core, and the (S+1)th turn of the first wire is wound in a second layer around the first layer; and a (T+1)th turn of the second wire is stacked on a Tth turn of the first wire and a Tth turn of the second wire, T being a positive integer less than (N−1) and different from S, wherein the Tth turn of the first wire and the Tth turn of the second wire are wound in the first layer, and the (T+1)th turn of the second wire is wound in the second layer.

2. The common mode filter of claim 1, wherein an absolute difference between T and S is equal to an even number.

3. The common mode filter of claim 1, wherein a quantity of inner turns of the first wire and a quantity of inner turns of the second wire are substantially equal.

4. The common mode filter of claim 1, wherein a quantity of outer turns of the first wire and a quantity of outer turns of the second wire are substantially equal.

5. The common mode filter of claim 1, wherein the first layer is interposed between the magnetic core and the second layer.

* * * * *